United States Patent

Brown

[15] 3,666,996

[45] May 30, 1972

[54] TELEPHONE LINE TERMINAL BLOCK COVER

[72] Inventor: Bryce H. Brown, Devon Manor, Pa.

[73] Assignee: Darr R. Brown, Lansing, Mich. ; a part interest

[22] Filed: Sept. 3, 1970

[21] Appl. No.: 69,359

[52] U.S. Cl. ....................317/118, 174/138 F, 317/122, 339/44 M, 339/198 J

[51] Int. Cl. ....................H01r 9/02

[58] Field of Search ....................174/138 F; 317/118, 122; 339/36, 44 R, 44 M, 198 J; 220/31 R, 31 S; 16/150

[56] References Cited

UNITED STATES PATENTS

| | | | |
|---|---|---|---|
| 2,096,559 | 10/1937 | Riley | 16/150 |
| 3,564,485 | 2/1971 | Cull | 174/138 F |
| 3,442,415 | 5/1969 | Glass | 220/32 |
| 3,173,062 | 3/1965 | Smith | 317/118 |

*Primary Examiner*—Lewis H. Myers
*Assistant Examiner*—Gerald P. Tolin
*Attorney*—Philip J. Rosewarne

[57] ABSTRACT

An improved telephone line terminal block cover is disclosed. The particular block to which the invention has application is a horizontally mounted terminal block having upper and lower matched arrays of terminal clips projecting upwardly and downwardly from the upper and lower horizontal surfaces of the terminal block, respectively. The disclosure presents a flat, rigid, acid-solder resistant hinged terminal guard. The specific structure includes a hinged plexiglass or cellulose acetate door, overlying the upwardly extending terminal clips. The door is swingable upon the hinges upwardly away from the metal clips, to gain access thereto. The door shields the terminal ends from electrical shorting by accidentally dropped objects, and also guards against other terminal fouling debris, including wire clippings and/or solder drippings from soldering operations at higher level rows or banks of similar horizontally mounted terminal blocks; the guard also acts as a personnel protecting device, preventing accidental body contact with the terminals.

4 Claims, 5 Drawing Figures

INVENTOR
BRYCE H. BROWN

BY
Philip J. Rosewarne
ATTORNEYS

TELEPHONE LINE TERMINAL BLOCK COVER

BACKGROUND OF THE INVENTION

This invention relates to electrical equipment in the nature of telephone line terminal blocks, and more particularly to articulated door type transparent terminal guards for such equipment.

Telephone line terminal blocks are well known to the art, and have become relatively standardized in construction. A very typical example of such a construction with an associated terminal guard, may be appreciated by reference to the left most column of page 54 of the telephone trade journal *Telephony* for Dec. 6, 1969. Such a device may be briefly described as a mounting block for a rectangular array of dual terminal clips, the clips being utilized for electrical connecting junctures. The mounting block is formed of typical dielectric material such as bakelite, high grade molded phenol, or the like, and is horizontally mounted by its flanged base to a wall frame (not shown). Typically, a substantial multiplicity of such terminal blocks are mounted in banks of horizontal rows on a large wooden or metal, linear frame (not shown). The flange base also may act as a distributing structure having wire lead apertures formed through it in a uniformly distributed pattern.

In the reference aforementioned, a flexible transparent terminal guard is provided, and may be observed in the normal, protect position. Such a device is secured in this normal position as shown, by its own weight, or by additional weighting elements attached to its outboard edge, so that when extended over the upper array of terminal clips, it drapes over the entire array of upper terminals.

My invention proposes an improved form of such a terminal guard, in which the guard structure is composed of a rigid, transparent, hinged cover guard, formed of a sufficiently thick acid-solder-heat resistant material, such as cellulose acetate. Such an improved structure, although simple in its departure from the guards of the previous state of the art, is nonetheless significantly superior thereto, in that it (1) provides for greatly increased ease of manipulation for access to the terminal clips underneath; and (2) provides a convenient and inexpensive solution to the problem of protecting an upper array of terminal clips from the perpetual problem of mechanical fouling and electrical shorts or interruptions, due to solder and/or wire clippings from soldering operations upon other terminal blocks situated at higher levels on the mounting frame. Either a solder splash or a wire clipping (which result from both soldered and wrapped connections) is likely to fall across exposed terminals causing an electrical short circuit. Cover guards in general are directed to preventing this occurrence; and the coverlet or lid of my invention is particularly formed of a sufficient thickness and composition to resist penetration by hot solder and/or acid which comprises the core of certain solders as flux.

The prior state of the art is represented by these coverlet type protectors, which, in order to be flexible in construction, were not conveniently fabricated of an appropriate thickness and composition to resist the acids and heats involved in the interception of soldering debris and acids, and the extremely destructive heats associated therewith. Moreover, the non-rigid nature of the prior art hinged type of structures has normally required two hands for its operation; it is not self-positioning (in that it must be manually pulled or drawn over the array of terminal clips to assure full coverage thereof); and, to secure it, there is required an auxiliary weight (inserted into a "hem" or otherwise attached to the outboard edge of the filmy sheet coverlet).

The guard of my invention is operable with one hand and is self-positioning because of its rigidity which dictates a fully extended, completely terminal covering position of the door guard, when flipped down. Appropriate positioning of the door for terminal access or coverage is easily and positively accomplished by a simple one hand flip of the door guard (which actuation leaves the other hand free for other activity, as for example the simultaneous actuation of a second guard while moving down a row to open all the doors thereon).

OBJECTS OF THE INVENTION

Consequently, it is an object of this invention to introduce a rigid, flip-type, line terminal block protector which is most easily manipulated and operated, by one hand; in a positively actuated fashion.

It is another object of this invention to introduce a new and useful type of telephone line terminal protector, constructed on a rigid concept which permits of its fabrication from materials of sufficient thickness and appropriate composition for a significantly improved resistance to heat, acid, wire clippings and solder, from soldering operations.

A still further object of the present invention is to teach a novel and useful telephone line terminal protector which is more durable and more conveniently manipulated than those of the prior art, and which requires no manual spreading for placement, or auxiliary weights for securement.

A still further object of the present invention is the disclosure of an improved telephone line terminal protector which offers increased protection to service personnel, but which also incorporates the advantage of a less expensive and simpler mode of manufacture.

Even further objects of the invention will be apparent to those skilled in the art, upon examination of the specification, drawings, and claims presented herewith.

IN THE DRAWINGS

FIG. 1 is a perspective view of a telephone terminal block combination which represents the prior state of the art, having a non-rigid, transparent, terminal-clip-protecting, guard.

FIG. 2 is a top plan view of the entire apparatus of the present invention showing a telephone terminal block, and an upward projection of rows of terminal clips (the extension of the rows being presented schematically in broken lines), and showing a transparent, rigid, tape-hinged terminal guard which is the essence of the present invention. Also shown are indicia which designate particular terminals; i.e., the numbers of 1–26 in this drawing.

DESCRIPTION OF PREFERRED EMBODIMENTS

Figures 1, 3, 5:
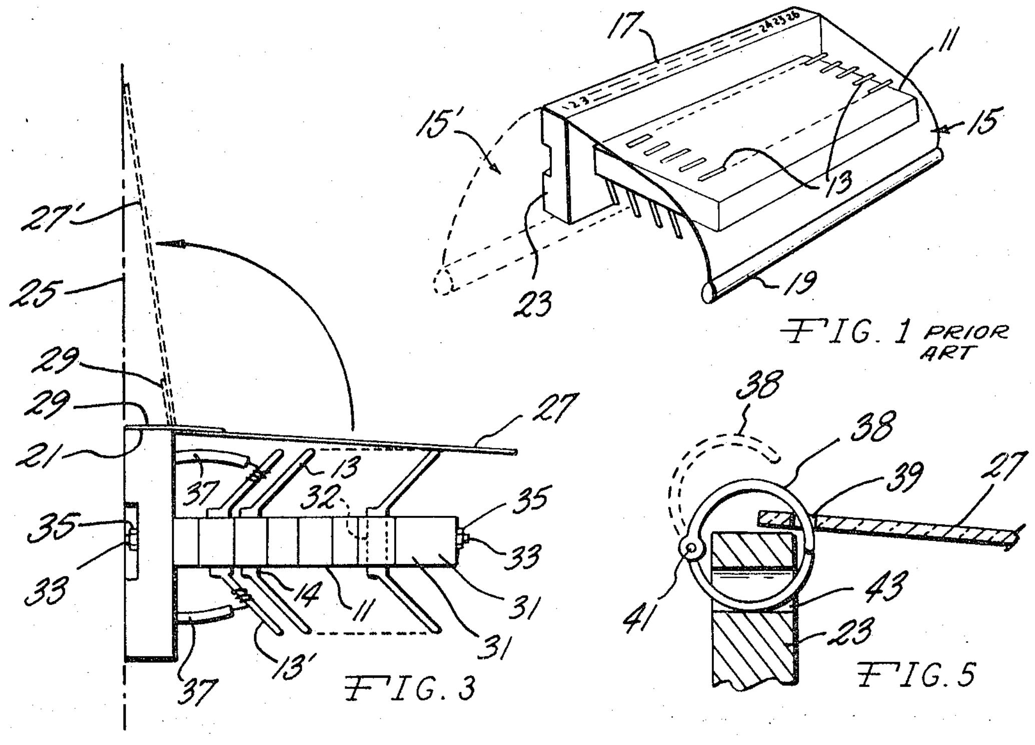
FIG. 1 PRIOR ART, FIG. 3, FIG. 5
FIG. 3 is a side elevational view of the hinged terminal guard of the present invention, which is shown in operational or protective disposition over the terminals of a telephone terminal block horizontally mounted to a wall panel structure; the rigid hinged guard being shown opened upwardly in the alternate, terminal exposure position.
FIG. 5 is a partial sectional view comparable to FIG. 4, but showing an alternate embodiment of the hinge structure of the transparent guard of the present invention.

FIG. 1 shows an example of a well known item of the prior art, that is, a line telephone terminal block 11 into which is embedded an array of electrical terminals which extend vertically through the telephone terminal supporting block 11 to form an upper projecting array of terminal clips or terminal ends 13 and a lower array of such clips 13' (See Fig. 3). The upper and lower arrays 13 and 13' are merely the extended ends of the unitary embedded basic clips 14.

Of particular interest in FIG. 1 is the flexible terminal guard 15 shown affixed by its inboard edge 17 to a base portion of the terminal block, from where it is drawn forward and draped over the front of the terminal block 11. In such position, the guard is extended in covering relation over the upper array of terminal clips 13, and is secured in this orientation by an auxiliary weight 19 or otherwise attached to the outboard edge of the terminal guarding coverlet 15. The weight 19, suspended over the forward edge of the terminal block, functions to stretch the coverlet 15 over the entire terminal array 13.

A disadvantage of such a coverlet type guard is its tendency to wrinkle; and also the frequent necessity to use two hands in its manipulation, in order to lift the entire coverlet and weight upwardly from the terminal surface and over the back of the terminal block into the alternate position shown at 15' without snagging the terminals 13. Thus, the weights and flexibility of the coverlet necessitate, at the least, some manual dexterity in transferring it to the terminal access position 15'. There is moreover, a tendency in this operation to drop the weight over the rear of the terminal block so that it drops to the extended position and jerks the coverlet, in repeated sudden strains at its point of connection to the terminal block at 17. This develops a tendency in the coverlet to tear or otherwise fail at the connection point.

In order to maintain an operable flexibility in such a coverlet, it is necessarily constructed of a reduced thickness which is subject to increased likelihood of puncture or tear; this thin film or sheet is also less effective in resisting the hot drippings of solder and/or acid core and wire clippings from soldering operations on terminals at higher level blocks.

Figure 2:
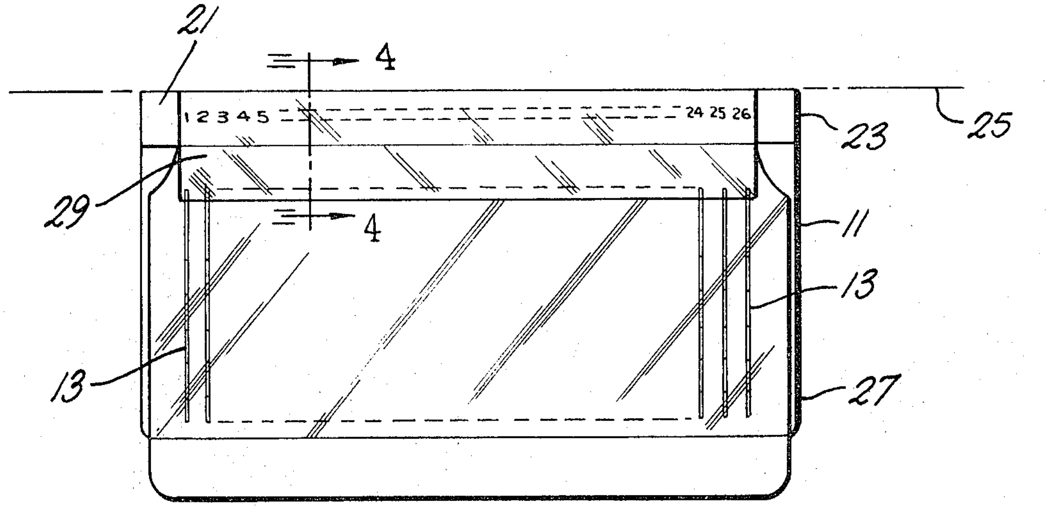

FIG. 2 shows an embodiment of my invention which incorporates, as a sub-combination, a terminal block 11, which need not be unlike that of the prior art (as depicted in FIG. 1). The entire structure is horizontally mounted by base portion 23 to a horizontal mounting frame 25. The novel feature of this combination is the terminal guard 27 which includes no weights, and is flat, transparent, and rigid in composition. Such a structure may be composed of, for purposes of describing an operative embodiment, celluose-acetate of 0.030 inches thickness. A hinge device 29 is provided in the form of a strip of tape having one edge affixed to the upper surface of the guard 27 and the other edge affixed to the upper base surface of the terminal block. Such tape is preferably transparent so as not to interfere with the transparency of the guard 27, and also to permit viewing the designation strip of numbers shown on the surface 21. Such a hinged tape 29 may be suitably provided by a poly-propylene adhesive tape readily obtainable from commercial sources, in 25-yard rolls with pull-off protective backing. It should be noted that the tape hinge construction of my invention requires no disassembly of the terminal block in order to connect the door guard 27, as do the prior art coverlet structures combined with stacked-construction terminal blocks (to be described hereinafter). Nor does this new hinge action develop weight dropping strains at the hinge line.

The rigid nature of the guards 27 may be better appreciated by reference to FIG. 3, which also gives a better appreciation of the hinged tape structure 29. The terminal block is seen to be of strip construction, i.e., composed of separate horizontal strips 31 (the ends of which may be seen in FIG. 3), and which are held together in stacked relation by assembly bolt 33 and nuts 35. To the telephone terminals or jacks 14 are connected electrical leads 37 (either soldered or by wrap connection). The separate strips 31 have terminal seating slots 32 through them, so that a pair of strips 31 may be separated and a terminal 14 inserted into a slot through the lower strip, with the upper strip or strips then restacked and secured. Thus, each terminal 14 is an integral unit which projects through the horizontal block 11 both upwardly and downwardly, to form both upper and lower arrays 13 and 13' of terminal ends or clips. It is the upper array 13 with which the terminal guard of this invention is primarily concerned.

The arrow in FIG. 3 indicates the hinged movement of the terminal guard 27, and it is represented in alternate terminal access position at 27'. In the normal, terminal protecting disposition, the guard 27 rests lightly on the outboard row of terminal 13. It should be appreciated that the upper mounting base surface 21 is disposed at a level at least as far removed from the body of the terminal block as the uppermost of the tips of the terminal clips 13, so that the guard 27 rests on the terminal clips when the block is mounted horizontally, as shown. This rigid structure is easily articulated to the access position, by a simple flip from one hand of an operator, inasmuch as the entire guard raises rigidly from any force lightly applied at a corner or edge thereof. Moreover, when it is flipped down it automatically covers all of the terminals without the necessity of being stretched into place, or having a securing weight draped over the front edge of the terminal block 11.

Figure 4:
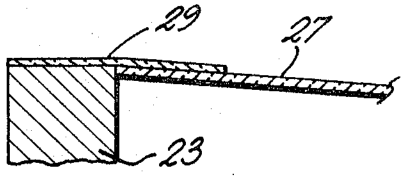
FIG. 4 is sectional view of the hinged structure of the rigid transparent guard of the present invention, taken at section line 4—4 of FIG. 2.

FIG. 4 shows an enlarged sectional representation of the hinged tape structure 29 with the door in the terminal-protect orientation.

In FIG. 5 may be observed an alternate hinging structure, which illustrates that transparent hinging is only one of many possible hinge means. This alternative embodiment incorporates snap rings 38 which engage in hinge apertures 39 on guard 27, which is thereby articulated upon the rings 38. The rings 38 are connected to the base structure 23 of the terminal block 11 and are assembled and disassembled by opening and closing on hinge pins 41 as shown in the alternate position 38'. The rings are engaged through terminal block base bores 43, which are normally provided upon the terminal block base 23 in any event, for distributive lead out of wires 37 from the jacks 13. Further alternatives, such as plastic bands substituted for the rings 38, may be utilized.

It should be appreciated that still other alternative embodiments may be provided without affecting the general utility of the concepts herein disclosed; for example a variety of types of terminal blocks might be incorporated into this combination, such as presently known integral, non-strip type blocks of solid rubber or plastic, into which terminal clips are seated or set, as opposed to the stacked strip type of terminal block depicted in the drawings.

Still other modifications, adaptations, substitutions and equivalencies will be apparent to those skilled in the art, upon examination of the drawings, specifications and claims presented herein; and such modifications, adaptations, substitutions and equivalent structures are intended to be within the spirit of the present invention, the scope of which is limited only by the hereinafter appended claims.

What is claimed is the following:

1. An improved telephone line terminal block comprising:
- a horizontally mountable dielectric terminal support block;
- a plurality of terminals embedded in said support block, and extended therefrom to form at least one upper array of terminal clips;
- a mounting base for said support block having an upper portion adjacent said upper array of terminals and extending upwardly at least as high as the uppermost of the tips of said upper array of terminal clips;
- a flat, rigid terminal guard, normally disposed substantially horizontally over said upper array of terminal clips and resting thereon; and
- a strip of adhesive flexible material affixed lengthwise to one edge of said guard and also affixed lengthwise to said upper portion of said mounting base, so as to hingedly connect said guard to said mounting base portion of said horizontal support block.

2. The apparatus of claim 1 with the further limitation that said rigid terminal guard is transparent.

3. The apparatus of claim 2 wherein said adhesive material is transparent, to reveal terminal designating indicia on the upper portion of said terminal block base.

4. An improved telephone line terminal block comprising:
- a horizontally mountable dielectric terminal support block;
- a plurality of terminals embedded in said support block, and extended therefrom to form at least one upper array of terminal clips;
- a mounting base for said support block having an upper portion adjacent said upper array of terminals and extending upwardly at least as high as the uppermost of the tips of said upper array of terminal clips;
- a flat, rigid terminal guard, normally disposed substantially horizontally over said upper array of terminal clips and resting thereon, and snap rings engaged through aligned holes formed near the inboard edge of said guard and through said mounting base portion of said terminal support block.

* * * * *